April 20, 1965  D. O. DAVIES ETAL  3,179,356
POWER PLANT
Filed Feb. 1, 1963  3 Sheets-Sheet 1
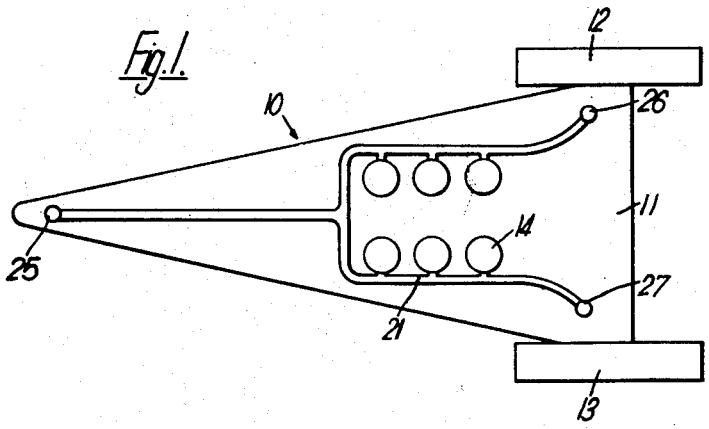
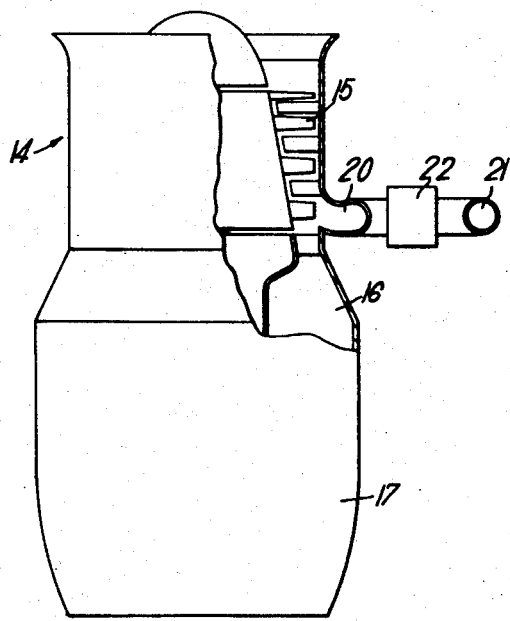
Inventors
David Omri Davies
James Reginald Simpson
By
Fred. E. Shoemaker
Fred L. Witherspoon, Jr.   Attorneys

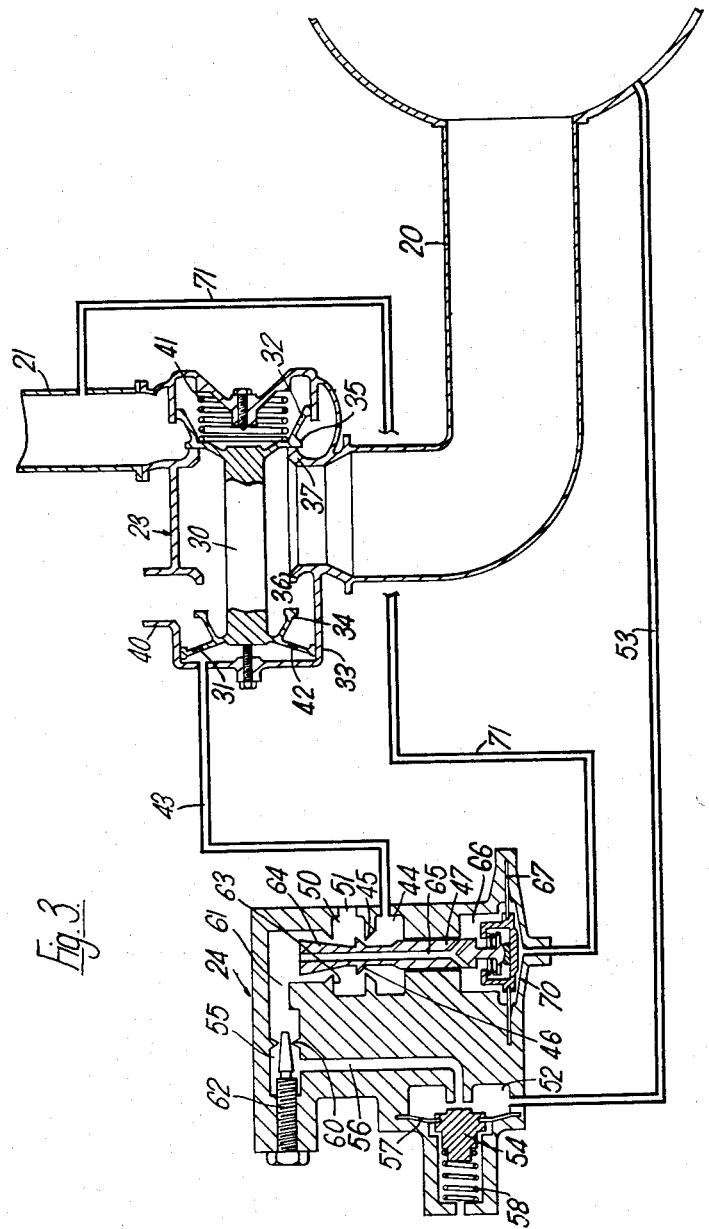

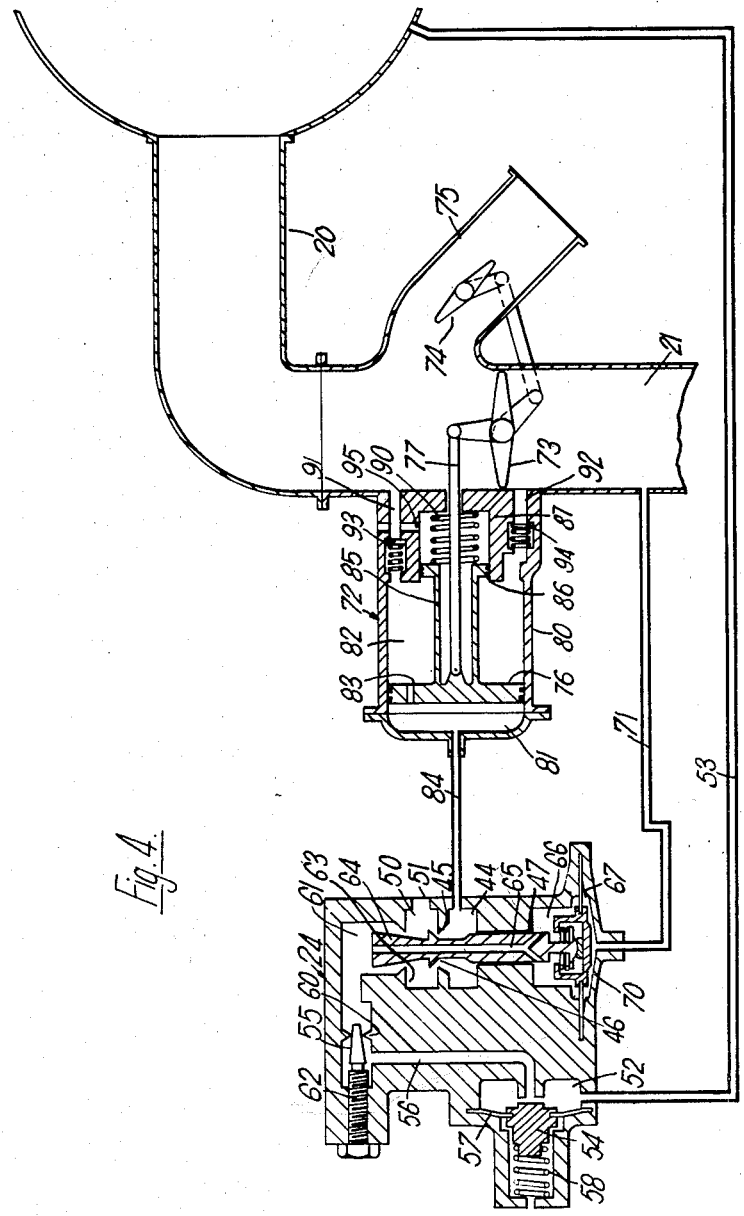

United States Patent Office 3,179,356
Patented Apr. 20, 1965

3,179,356
POWER PLANT
David Omri Davies, Kingsway, Derby, and James Reginald Simpson, Littleover, Derby, England, assignors to Rolls-Royce Limited, Derby, England, a company of Great Britain
Filed Feb. 1, 1963, Ser. No. 255,463
9 Claims. (Cl. 244—23)

This invention concerns power plant.

According to the present invention, there is provided power plant comprising a plurality of gas turbine engines each of which is provided with a bleed air passage which is arranged to receive part of the air which has been compressed by the engine, a common duct with which each of the bleed air passages communicates by way of a bleed air valve, and a valve control device for each bleed air valve, each valve control device ensuring that the bleed air valve is respectively maintained in closed and open positions when the ratio of the pressure in the bleed air passage to that in the common duct is respectively below and at or above a predetermined value, the arrangement being such that when a bleed air valve is in the closed position the amount of air bled from the respective engine is reduced so as to permit the said engine to speed up and the pressure in the respective bleed air passage to rise.

Each valve control device preferably comprises a pressure responsive member which is subjected to a function of the pressure drop across the respective bleed air valve.

Each bleed air valve preferably incorporates a vent passage which is respectively maintained closed and opened when the bleed air valve is respectively in the open and closed positions, the arrangement being such that less air from the respective bleed air passage may pass to the vent passage than to the common duct, whereby closure of a bleed air valve reduces the amount of air bled from the respective engine.

Each bleed air valve may comprise a valve member which is urged towards the closed position by resilient means and which is urged towards the open position by the pressure in a conduit, the said conduit communicating with the respective bleed air passage and having a vent therein, and the respective valve control device effecting opening and closing of said vent in dependence upon the value of the said ratio.

The said pressure responsive member of each valve control device is preferably connected to a valve which effects opening and closing of said vent.

Preferably the valve member of each bleed air valve is integrally formed with or connected to a piston having a restricted aperture therethrough, one side of the piston facing and communicating with the respective bleed air passage and the other side of the piston facing and communicating with the said conduit.

The said one side of the piston may communicate with the respective bleed air passage and with the common duct by way of passages containing non-return valves which permit flow towards the piston only.

The invention also comprises an aircraft provided with power plant as set forth above, the said gas turbine engines of the power plant being employed as vertical lift engines, i.e., as engines which produce vertical lift forces on the aircraft independently of those generated aerodynamically by forward flight.

Thus the said power plant on the aircraft may supply air to nozzles which are adapted to be used in controlling the flight attitude of the aircraft.

The invention is illustrated, merely by way of example, in the accompanying drawings in which—

FIGURE 1 is a diagrammatic plan view of a vertical take-off aircraft provided with power plant according to the present invention, FIGURE 2 is a part-sectional diagrammatic view of a vertical lift gas turbine engine forming part of the power plant of FIGURE 1, FIGURE 3 is a diagrammatic sectional view of a bleed air valve and a valve control device forming part of the power plant of FIGURE 1, and FIGURE 4 is a view similar to FIGURE 3 but showing a modified bleed air valve.

Terms such as "left," "right," "upwardly" and "downwardly" as used in the description below are to be understood to refer to directions as seen in the drawings.

Referring first to FIGURE 1, a vertical take-off aircraft 10 has a delta-shaped wing 11 which is provided with horizontally disposed forward propulsion gas turbine engines 12, 13 and with six downwardly directed, vertical lift gas turbine engines 14.

Each of the vertical lift engines 14 (see FIG. 2) comprises a compressor 15, combustion equipment 16 and a turbine 17. Part of the air compressed by the compressor 15 of each vertical lift engine 14 passes to a bleed air passage 20.

Each of the bleed air passages 20 communicates with a common duct 21 by way of control equipment which is shown diagrammatically in FIGURE 2 at 22, each control equipment 22 consisting essentially of a bleed air valve 23 and a valve control device 24 (see FIG. 3).

The common duct 21 is provided with downwardly directed attitude control nozzles 25, 26, 27. Means (not shown) are provided for altering the relative amounts of air supplied to the nozzles 25, 26, 27 so as to control the flight attitude of the aircraft 10 and hence to control pitching, yawning and rolling of the aircraft.

Each of the bleed air valves 23 comprises a valve member 30 which is provided, adjacent its left hand and right hand ends respectively with end flanges 31, 32 which are slidably mounted, and act as pistons, within a valve body 33.

The end flanges 31, 32 are themselves provided with annular flanges 34, 35 respectively. The latter are respectively adapted to cooperate with valve seats 36, 37 through which bleed air from the respective bleed air passage 20 may flow to a vent passage 40 and to the common duct 21 respectively.

Each bleed air valve 23 may be set in a closed position in which the annular flange 35 is seated as shown on the valve seat 37 and in which the annular flange 34 is spaced from the valve seat 36. When a bleed air valve 23 is in the said closed position 6%, say, of the air compressed by the respective engine compressor 15 may pass from the respective bleed air passage 20 and through the valve seat 36 to pass to atmosphere through the vent passage 40, the proportion of the compressed air being dictated by the effective cross-sectional area of vent passage 40.

Each bleed air valve 23 may also be set in an open position in which the annular flange 34 is seated on the valve seat 36 and in which the annular flange 35 is spaced from the valve seat 37. When the bleed air valve 23 is in the said open position, 10% to 13%, say, of the air compressed by the respective engine compressor 15 may pass from the respective bleed air passage 20 and through the valve seat 37 to the common duct 21, the proportion of compressed air being dictated by the effective cross-sectional area of duct 21.

A spring 41 urges the valve member 30 of each bleed air valve 23 towards the left i.e. towards the position shown in which the bleed air from the respective bleed air passage 20 may pass to the vent passage 40 but is prevented from passing to the common duct 21.

The end flange 31 of each bleed valve 23 has a restricted aperture 42 therethrough and there is a pipe 43 which communicates both with the left hand side of the end flange 31 and with a chamber 44 in the respective valve control device 24.

The chamber 44 has an aperture 45 flow through which is controlled by a frusto-conical portion 46 of a valve member 47. When the frusto-conical portion 46 does not seal the aperture 45, air from the chamber 44 may pass to a chamber 50 having a vent 51 to atmosphere.

A chamber 52 in each valve control device 24 communicates with the respective bleed air passage 20 by way of a pipe 53.

When a valve member 54 is in the open position shown, the chamber 52 communicates with a chamber 55 by way of a passage 56. The valve member 54 is carried by a resilient diaphragm 57 and is urged towards the closed position by a spring 58.

The chamber 55 communicates by way of a restricted aperture 60 with a chamber 61, a needle valve member 62, which is screwed into the body of a valve control device 24, extending through the restricted aperture 60, whereby the effective size of the restricted aperture 60, and hence the pressure in the chamber 61, may be readily altered. This arrangement is employed because the full pressure of the air in the bleed air passage 20 is not necessary for control purposes.

The chamber 61 includes a variable restrictor formed by an aperture 63 which communicates with the chamber 50 and which is adapted to be varied in effective area by a frusto-conical portion 64 of the valve member 47. Therefore the pressure in the chamber 61 will depend upon the position of the frusto-conical portion 64 within the aperture 63.

The valve member 47 is provided with an axially extending internal passage 65 by means of which the chamber 61 communicates at all times with a chamber 66 whose lower end is constituted by a diaphragm 67 against which bears the valve member 47. Below the diaphragm 67 is a space 70 which communicates with a pipe 71 leading to the common duct 21.

The pipe 53, passage 56, chamber 61, chamber 50, chamber 44 and pipe 43 constitute a conduit, the pressure in the conduit urging the valve 30 towards the closed position to open the bleed air passage 20 to the common duct 21.

In operation when the engines 14, which are adapted to be brought into operation simultaneously, are first started up, and reach a predetermined rotational speed, the parts are disposed in the positions shown in FIG. 3. The bleed air valves 23 will be in the closed position at this time because the effective cross-sectional area of the flange 31 is greater than that of the flange 35. Accordingly, 6% of the air compressed by each of the engines 14 will pass to atmosphere through the respective vent passage 40, this 6% bleed being provided to prevent surging of the compressors 15.

Some of the air from each of the bleed air passages 20 will pass via the pipe 53 to the chamber 52 and when the pressure of the air in the chamber 52 has risen to a predetermined value, which corresponds to the predetermined speed mentioned before, the valve member 54 will open. Air from the chamber 52 will then flow through the passage 56 into chamber 55 and then through the restricted aperture 60 into the chamber 61 and internal passage 65 to the chamber 66. The diaphragm 67, and hence the valve member 47, will therefore be forced downwardly since the space 70 will not at this time be pressurised from the common duct 21.

Accordingly, the frusto-conical portions 46 of the valve member 47 will seal the aperture 45. The frusto-conical portion 64 restricts the area of the aperture 63 such that a pressure drop is produced thereacross in all positions of the valve member 47. When the valve member 47 is in its uppermost position, as shown, the diaphragm 67 is forced downwardly only when the pressure of air in the bleed air passage 20 is, say, 6% higher than the pressure in the common duct 21.

Some of the air from each of the bleed air passages 20 will also pass via the restricted aperture 42 and pipe 43 to the chamber 44. As explained in the preceding paragraph, however, the aperture 45 will at this time be sealed so that air in the chamber 44 cannot escape to atmosphere through the vent 51. Accordingly the pressure in the chamber 44 will gradually rise until it reaches a value sufficient to move the valve member 30 towards the right against the action of the spring 41. The valve member 30 will then be in the open position in which, say, 10% to 13% of the air compressed by the engine compressor 15 passes to the common duct 21.

A bleed of air from the common duct 21 passes through each of the pipes 71 to the respective space 70 beneath the respective diaphragm 67. Each diaphragm 67 is therefore subjected to a function of the pressure drop across its bleed air valve 23.

The pressure in the bleed air passage 20 must always be slightly higher than the pressure in the common duct 21 before the valve member 30 is caused to open. This is essential because the effective area of the vent passage 40 is smaller than the effective area of the valve seat 37 and as soon as the valve member 30 moves to the said open position there is a drop in pressure within the bleed air passage 20. Therefore, if the pressures within the bleed air passage 20 and common duct 21 were to be equal or nearly equal when the valve member 30 was opened the pressure in the bleed air passage would fall below that of the common duct 21 and there would be a flow of air from the common duct 21 into the engine.

The variable restrictor formed by the aperture 63 and frusto-conical portion 64 ensures that the pressure within the bleed air passage 20 is, say, 6% higher than the pressure within the common duct 21 before the bleed valve 30 opens.

As stated before, there is a drop in pressure in the bleed air passage 20 when the valve member 30 is moved to the open position and this pressure may then only be, say, ½% higher than the pressure in the common duct. If the aperture 63 had a fixed area the pressure signal acting on the valve member 47 would be such as to cause the valve member 47 to move upwards to make the valve member 30 close again until the pressure in the bleed air passage restored itself to the 6% higher value and the system would be unstable.

By making the restrictor variable as described, as soon as the valve member 47 moves downwardly to cause the valve member 30 to open, the area of the aperture is reduced so that the pressure in the chamber 66 acting on the diaphragm 67 increases even though there is a pressure drop in the bleed air passage 20, thereby preventing the system from closing the valve member 30.

If therefore, one of the engines 14 lags behind the others, i.e., if the pressure of the air compressed thereby is below that of the others, the bleed valve 30 will not be allowed to open until the lagging engine is producing a predetermined bleed air pressure.

If an engine loses power during operation the pressure in the common duct 21 will rise relatively to the pressure in the respective bleed air passage 20 and hence in the space 70. The diaphragm 67, together with its valve member 47, will therefore be forced upwardly, whereby the aperture 45 will no longer be sealed by the frusto-conical portions 46 of the valve member 47. Also the effective area of the aperture 63 will be increased due to the upward movement of the portion 64.

The air in the chamber 44 will be vented to atmosphere through the vent 51 and the pressure on the left hand side of the end flange 31 will therefore fall, whereby the valve member 30 will be forced into the closed position shown in FIG. 3.

In the said closed position, however, only 6% as opposed to 10% to 13% of air is bled from the respective engine 14. The respective engine 14 therefore speeds up since the flow through its turbine 17 will be increased, and the pressure in its bleed air passage 20 rises until, when it has risen sufficiently, the valve member 30 is caused to be moved into the open position again.

The bleed air valves 23 and the control devices 24 therefore ensure that air from the common duct 21 is not recirculated to a lagging engine.

In FIGURE 4 there is shown an arrangement employing the same valve control device 24 as that of FIGURE 3. In the FIGURE 4 arrangement, however, each engine 14 has a bleed air valve 72 which is provided with butterfly valve members 73, 74. The butterfly valve members 73, 74 respectively control flow from the bleed air passage 20 to the common duct 21 and to a vent passage 75.

The butterfly valve members 73, 74 are connected to each other and to a piston 76 by means of a linkage 77.

Each bleed air valve 72 may be set in the closed position shown in FIG. 4 in which the butterfly valve member 73 prevents air from the bleed air passage 20 passing to the common duct 21 and in which the butterfly valve member 74 is so disposed as to permit, say, 6% of the air compressed by the respective engine 14 to pass to the vent passage 75. Each bleed air valve 72 may also be set in an open position (not shown) in which the butterfly valve member 74 prevents air from the bleed air passage 20 passing to the vent passage 75 and in which the butterfly valve member 73 is so disposed as to permit, say, 10% to 13% of the air compressed by the respective engine 14 to pass to the common duct 21.

The piston 76 is movable in a cylinder 80 so as to move the butterfly valve members 73, 74 between the closed and open positions.

On the left- and right-hand sides of the piston 76 there are spaces 81, 82 respectively. The spaces 81, 82 communicate with each other by way of a restricted aperture 83 through the piston 76, while the space 81 communicates with the chamber 44 within the valve control device 24 by way of a pipe 84.

The piston 76 constitutes the left-hand end wall of a sleeve 85 through which passes part of the linkage 77. The sleeve 85 is provided at its right-hand end with a piston 86. The latter is slidable in a cylindrical chamber 87 and is urged towards the left by a spring 90.

The space 82 communicates with the bleed air passage 20 and with the common duct 21 by way of passages 91, 92 respectively in which are mounted non-return valves 93, 94 respectively. The non-return valves 93, 94 permit flow through the passages 91, 92 towards the space 82 only.

The cylindrical chamber 87 is vented to atmosphere by a passage 95.

In operation, when the engines 14 are first started up, and reach a predetermined rotational speed, the parts are disposed in the positions shown in FIGURE 4. Each of the bleed air valves 72 will be in the closed position at this time since its piston 76 will be urged towards the left by the pressure of air acting on the piston 76 and by the load exerted by the spring 90, whereby the butterfly valve member 73 will be closed and the butterfly valve member 74 will be open to permit, say, 6% of the air compressed by the respective engine 14 to be vented to atmosphere through the vent passage 75.

When the pressure of the air in the bleed air passage 20 has reached a predetermined value, some of the air will, as explained with reference to the embodiment of FIG. 3, pass via the pipe 53 to the chamber 66, whereby the frusto-conical portion 46, of the valve member 47 is moved into sealing relationship with the aperture 45.

Some of the air from the bleed air passage 20 will also pass through the passage 91 and into the space 82. Air from the space 82 may pass through the restricted aperture 83 to the space 81 and so via the pipe 84 to the chamber 44. Since the aperture 45 of the chamber 44 will at this time be sealed, the pressure in the chamber 44 will gradually rise until it is sufficiently great to force the piston 76 towards the right against the action of the spring 90. This will cause the butterfly valve member 74 to close and the butterfly valve member 73 to open to a position in which, say, 10% to 13% of the air compressed by the respective engine may pass to the common duct 21.

A bleed of air from the common duct 21 passes through each of the pipes 71 to the respective space 70 whereby, as explained above with reference to the embodiment of FIGURE 3, each diaphragm 67 is subjected to a function of the pressure drop across its bleed air valve 72.

If, as explained above with reference to the embodiment of FIGURE 3 one of the engines 14 lags behind the others, the butterfly valve member 73 will not be allowed to open and the butterfly valve member 74 will not close until the lagging engine is producing a predetermined bleed air pressure. If an engine loses power during operation, the pressure in the space 70 in the respective valve control device 24 will rise relatively to that in the chamber 66 and the valve member 47 will move upwardly so as to permit the chamber 44 to be vented to atmosphere through the vent 51. The pressure in the space 81 will therefore fall.

At the same time, the pressure in the space 82 will rise since air from the common duct 21 will pass through the passage 92 into the space 82, the pressure of the said air being at this time sufficiently great to open the non-return valve 94.

The piston 76 will therefore be moved towards the left so as to move the butterfly valve member 73 into the closed position. As explained above with reference to the embodiment of FIG. 3, this reduces the amount of air bled from the respective engine 14, whereby the engine speeds up and the pressure in its bleed air passage 20 rises. When this pressure has risen sufficiently, the butterfly valve member 73 is moved into the open position again.

We claim:

1. Power plant comprising a plurality of gas turbine engines, a bleed air passage provided on each gas turbine engine, arranged to receive part of the air which has been compressed by the engine, a common duct with which each of the bleed air passages communicates, a bleed air valve associated with each said bleed air passage, a vent passage in each said bleed air valve and a valve control device for each bleed air valve, each valve control device ensuring that the bleed air valve is respectively maintained in closed and open positions when the ratio of the pressure in the bleed air passage to that in the common duct is respectively below and above a predetermined value, each said vent passage being respectively maintained closed and opened when the bleed air valve is respectively in the open and closed positions, the effective cross-sectional area of the vent passage being smaller than that of the common duct thus ensuring that less air from the respective bleed air passage may pass to the vent passage than to the common duct, whereby closure of a bleed air valve reduces the amount of air bled from the respective engine so as to permit the said engine to speed up and the pressure in the respective bleed air passage to rise.

2. An aircraft provided with power plant as claimed in claim 1, the said gas turbine engines of the power plant being employed as vertical lift engines.

3. An aircraft provided with power plant as claimed in claim 1, the said gas turbine engines of the power plant being employed as vertical lift engines, nozzles, which are adapted to be used in controlling the flight attitude of the aircraft, being provided on said aircraft, said common duct supplying air to said nozzles.

4. Power plant comprising a plurality of gas turbine engines, a bleed air passage provided on each gas turbine engine, arranged to receive part of the air which has been compressed by the engine, a common duct with which each of the bleed air passages communicates, a bleed air valve associated with each said bleed air passage, each bleed air valve comprising a valve member, resilient means urging said valve member towards a closed position and a conduit, the pressure in which urges said valve member towards an open position, the said conduit communicating with the respective bleed air passage and having a vent therein, a valve control device for each bleed air valve, each valve control device comprising a pressure responsive member which is subjected to a function of the pressure drop across the respective bleed air valve and which is mechanically connected to a valve which moves with the pressure responsive member and effects opening and closing of said vent in dependence upon the ratio of the pressure in the bleed air passage to that in the common duct, and a vent passage in each said bleed air valve, each said vent passage being respectively maintained closed and opened when the bleed air valve is respectively in the open and closed positions, the effective cross-sectional area of the vent passage being smaller than that of the common duct thus ensuring that less air from the respective bleed air passage may pass to the vent passage than to the common duct, whereby closure of a bleed air valve reduces the amount of air bled from the respective engines so as to permit the engine to speed up and the pressure in the respective bleed air passage to rise.

5. Power plant comprising a plurality of gas turbine engines, a bleed air passage provided on each gas turbine engine, arranged to receive part of the air which has been compressed by the engine, a common duct with which each of the bleed air passages communicate, a bleed air valve associated with each said bleed air passage, each bleed air valve comprising a vent passage, a valve member, resilient means urging said valve member towards a closed position and a conduit, the pressure in which urges said valve member towards an open position, the said conduit communicating with the respective bleed air passage and having a vent therein, and a valve control device for each bleed air valve, each valve control device effecting opening and closing of said vent and thus ensuring that the bleed air valve is respectively maintained in closed and open positions when the ratio of the pressure in the bleed air passage to that in the common duct is respectively below and above a predetermined value, each said vent passage being respectively maintained closed and opened when the bleed air valve is respectively in the open and closed positions, the effective cross-sectional area of the vent passage being smaller than that of the common duct thus ensuring that less air from the respective bleed air passage may pass to the vent passage than to the common duct, whereby closure of a bleed air valve reduces the amount of air bled from the respective engine so as to permit the said engine to speed up and the pressure in the respective bleed air passage to rise.

6. Power plant comprising a plurality of gas turbine engines, a bleed air passage provided on each gas turbine engine, arranged to receive part of the air which has been compressed by the engine, a common duct with which each of the bleed air passages communicates, a bleed air valve associated with each said bleed air passage, each bleed air valve comprising a vent passage, a valve member, resilient means urging said valve member towards a closed position and a conduit, the pressure in which urges said valve member towards an open position, the said conduit communicating with the respective bleed air passage and having a vent therein, and a valve control device for each pressure responsive member which is subjected to a function of the pressure drop across the respective bleed air valve and which is mechanically connected to a valve which moves with the pressure responsive member and effects opening and closing of said vent thus ensuring that the bleed air valve is respectively maintained in closed and open positions when the ratio of the pressure in the bleed air passage to that in the common duct is respectively below and above a predetermined value, each said vent passage being respectively maintained closed and opened when the bleed air valve is respectively in the open and closed positions, the effective cross-sectional area of the vent passage being smaller than that of the common duct thus ensuring that less air from the respective bleed air passage may pass to the vent passage than to the common duct, whereby closure of a bleed air valve reduces the amount of air bled from the respective engine so as to permit the said engine to speed up and the pressure in the respective bleed air passage to rise.

7. Power plant comprising a plurality of gas turbine engines, a bleed air passage provided on each gas turbine engine, arranged to receive part of the air which has been compressed by the engine, a common duct with which each of the bleed air passages communicates, a bleed air valve associated with each said bleed air passage, each bleed air valve comprising a vent passage, a valve member, resilient means urging said valve member towards a closed position and a conduit, the pressure in which urges said valve member towards an open position, a piston, having a restricted aperture therethrough connected to said valve member one side of the piston facing and communicating with the respective bleed air passage and the other side of the piston facing and communicating with the said conduit which has a vent therein, and a valve control device for each bleed air valve, each valve control device effecting opening and closing of said vent and thus ensuring that the bleed air valve is respectively maintained in closed and open positions when the ratio of the pressure in the bleed air passage to that in the common duct is respectively below and above a predetermined value, each said vent passage being respectively maintained closed and opened when the bleed air valve is respectively in the open and closed positions, the effective cross-sectional area of the vent passage being smaller than that of the common duct thus ensuring that less air from the respective bleed air passage may pass to the vent passage than to the common duct, whereby closure of a bleed air valve reduces the amount of air bled from the respective engine so as to permit the said engine to speed up and the pressure in the respective bleed air passage to rise.

8. Power plant as claimed in claim 7 in which the said one side of the piston communicates with the respective bleed air passage and with the common duct by way of passages containing non-return valves which permit flow towards the piston only.

9. Power plant comprising a plurality of gas turbine engines, a bleed air passage provided on each gas turbine engine, arranged to receive part of the air which has been compressed by the engine, a common duct with which each of the bleed air passages communicates, a bleed valve associated with each said bleed air passage, each bleed air valve comprising a vent passage, a valve member, resilient means urging said valve member towards a closed position and a conduit, the pressure in which urges said valve member towards an open position, the said conduit communicating with the respective bleed air passage and having a vent therein, and a valve control device for each bleed air valve, each valve control device comprising a diaphragm, opposite sides of which are connected to said bleed air passage and the common duct respectively, a valve mounted on said diaphragm for movement therewith and arranged to effect opening and closing of said vent and thus ensuring that the bleed air valve is respectively maintained in closed and open positions when the ratio of the pressure in the bleed air passage to that in the common duct is respectively below and above a predetermined value, each said vent passage being respectively maintained closed and opened when the bleed air valve is respectively in the open and closed positions, the effective cross-sectional area of the vent passage being smaller than that of the common duct thus ensuring that less air from the respective bleed air passage may pass to the vent passage than to the common duct, whereby closure of a bleed air valve reduces the amount of air bled from the respective engine so as to permit the said engine to speed up and the pressure in the respective bleed air passage to rise.

References Cited by the Examiner

UNITED STATES PATENTS

| | | | |
|---|---|---|---|
| 2,870,978 | 1/59 | Griffith et al. | 244—23 |
| 3,058,695 | 10/62 | Simonis | 60—39.09 X |
| 3,068,647 | 12/62 | Santamaria et al. | 60—39.09 X |

FOREIGN PATENTS 806,030  12/58  Great Britain.

FERGUS S. MIDDLETON, *Primary Examiner.*